May 9, 1967

C. C. WINTERLING 3,318,590

MOVING BED AGGLOMERATION APPARATUS

Filed Feb. 10, 1965

INVENTOR.
CLEE C. WINTERLING
BY
Bosworth, Sessions,
Herrstrom & Knowles
ATTORNEYS May 9, 1967 C. C. WINTERLING 3,318,590
MOVING BED AGGLOMERATION APPARATUS
Filed Feb. 10, 1965 3 Sheets-Sheet 2

INVENTOR.
CLEE C. WINTERLING
BY
Bosworth, Sessions,
Herrstrom & Knowles
ATTORNEYS May 9, 1967  C. C. WINTERLING  3,318,590
MOVING BED AGGLOMERATION APPARATUS
Filed Feb. 10, 1965  3 Sheets-Sheet 3
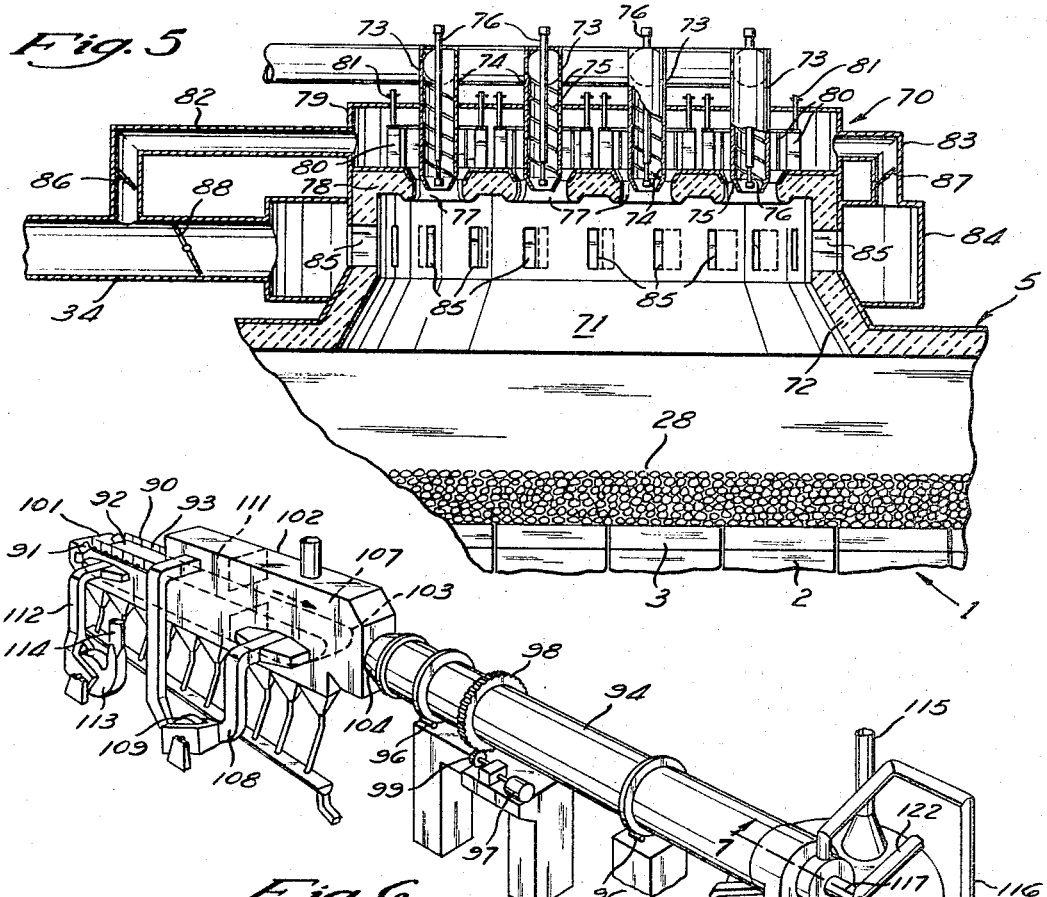
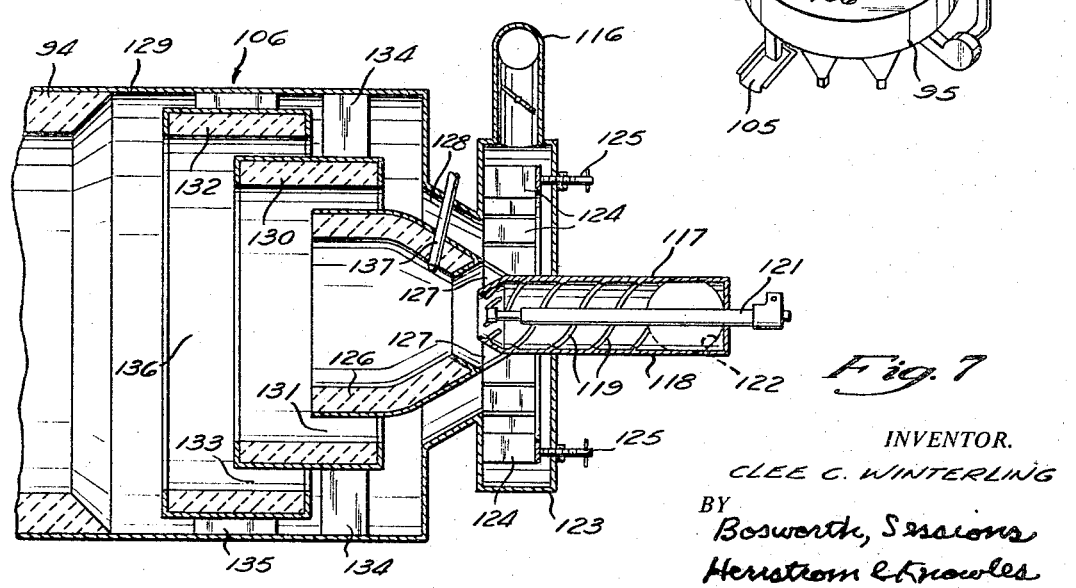
INVENTOR.
CLEE C. WINTERLING
BY
Bosworth, Sessions
Herrstrom & Knowles
ATTORNEYS United States Patent Office 3,318,590
Patented May 9, 1967

3,318,590
MOVING BED AGGLOMERATION APPARATUS
Clee C. Winterling, Amherst, Ohio, assignor to Arthur G. McKee & Company, Cleveland, Ohio, a corporation of Delaware
Filed Feb. 10, 1965, Ser. No. 431,531
17 Claims. (Cl. 263—28)

This invention relates to the agglomeration of finely divided materials, such as ores or other smeltable metal compounds, by heating, and more particularly to apparatus for heating such materials to agglomerate them by the combustion of particulate solid fuel such as coal.

While the invention may be advantageously used in various types of agglomeration of various kinds of finely divided materials, it will be discussed below primarily in connection with pelletizing beneficiated iron ore to form heat-hardened pellets havng sufficient strength and hardness to permit them to be handled, shipped, stored and charged into blast furnaces or other smelting apparatus. The method and apparatus of the invention provides particular advantages in such uses.

In the production of such heat-hardened iron ore pellets, water and finely divided ore, ore concentrate, flue dust, or other iron-bearing material, either alone or with particles of solid fuel, flux materials or other substances, are mixed together to form a moist, mud-like mass which is then formed into green balls by any suitable and well-known means. To as great an extent as possible, these balls are of a uniform desired size, usually between about ¼″ to about 1″ in diameter, and preferably between about ⅜″ and about ½″ in diameter. Pelletizing, involving proper drying and heating of these balls, will remove the moisture and strengthen them by heat-hardening them so that they may thereafter be handled, shipped, stored and charged by conventional apparatus. Horizontal traveling grate and grate-kiln pelletizing machines are the most widely used types of pelletizing machines.

The typical horizontal traveling grate type of pelletizing machine comprises a number of pellets which, in the material-carrying run of the grate, abut and define a continuous traveling grate having a permeable bottom hearth and upwardly extending confronting sidewalls. In a typical pelletizing operation on such a machine, the green balls are deposited in a layer or bed of predetermined thickness at the charging end of such run of the grate as it travels along a pelletizing path, in which the balls are pelletized by being subjected to drying, high temperature heating, and cooling or other treatments as the grate moves through several zones of the pelletizing machine. This procedure involves passing air in the cooling zone, and hot gases in the other zones, through the bed of balls on the grate, either downdraft or updraft or in a combination of drowndraft and updraft gas flows.

The typical grate-kiln type of pelletizing machine has a similar but shorter traveling grate having a permeable bottom hearth and upwardly extending confronting sidewalls. Green balls are deposited on the grate and travel through drying and preheating zones on the grate in which the balls are partially hardened; the balls discharge from the grate into a kiln that rotates about an axis inclined downwardly from its receiving end to its discharge end, from which the balls pass to a cooler. Hot combustion gases are introduced into the kiln at its discharge end, and complete the heat-hardening of the balls; the gases leave the kiln and pass one or more times downwardly through the grate for the heating operations that are used on the grate.

Heretofore, the hot gases utilized in these pelletizing machines have been supplied by the combustion of gaseous or liquid fuels that are mixed with primary combustion air and burned in secondary combustion air to form the desired hot gases at the desired temperature. Although great effort and much ingenuity has been expended in achieving as high efficiency as possible with such fuels, fuel costs are one of the major elements in the operating costs per gross ton of pellets produced because of the high temperatures and large quantities of heat that must be employed and the relatively high costs per B.t.u. heat unit of liquid and gaseous fuels. For example, in pelletizing iron ore, maximum gas temperatures of about 2400° F. are necessary and the pellets must be subjected to such temperaures for a substantial period of time. Althuogh hot gases are recuperated, the cost of the heat still is an important factor in the cost of the pellets.

Solid carbonaceous fuel, such as coal, provides noteworthy possibilities of reducing the cost of the heat that it is necessary to supply to the pelletizing machine. In order, however, to achieve maximum savings in fuel costs, it is necessary to burn the coal with high combustion efficiency and desirable to use lower grade, lower cost coals. These coals, however, develop relatively large quantities of ash during combustion, which can impair operation of the pelletizing machine by clogging or coating surfaces or ducts or other parts or abrading blowers and ducts, etc. Furthermore, when coal is burned efficiently, it develops gaseous products of combustion having temperatures in excess of about 2800° F., whereas the maximum temperature of the gases utilized in the pelletizing process must be several hundred degrees less.

It is an object of the present invention to provide agglomeration apparatus permitting the use of particulate coal or other suitable solid fuel in the agglomeration of finely divided material, while reducing or eliminating the problems arising from the presence of ash. Another object is the provision of such apparatus that permits the burning of solid fuel at temperatures providing for a high degree of combustion efficiency, while permitting the cooling of the combustion gases to desired lower temperatures without extinguishing the flame or providing other adverse effects. Another object is the provision of pelletizing apparatus in which the hot gases utilized in the pelletizing process are heated by burning of particulate solid fuel. A further object is the provision of a burner for burning particulate solid fuel to produce the hot gases necessary to agglomeration processes under conditions in which the fuel is burned efficiently and the hot products of combustion are mixed with air to reduce the temperature of the resulting gases to a desired temperature.

These and other objects of the invention will become apparent from the following description of several embodiments in connection with the accompanying drawings in which:

FIGURE 5 is a section through a different embodiment of a horizontal grate pelletizing machine in which several burner nozzles are utilized in the same burner housing;

FIGURE 6 is a perspective of a grate kiln pelletizing machine embodying the invention; and FIGURE 7 is a section along line 7—7 showing the type of burner utilized.

Figure 1:
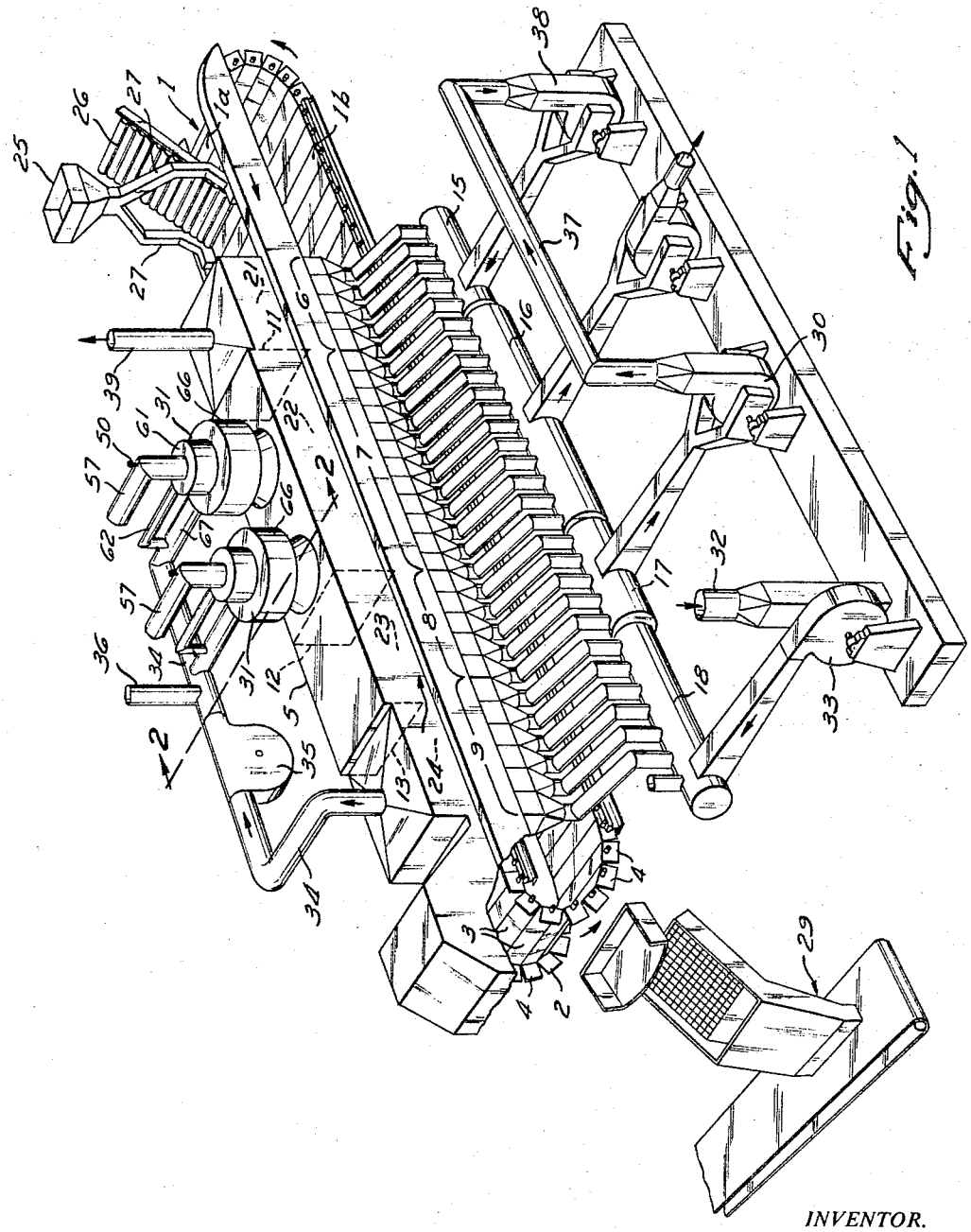
FIGURE 1 is a perspective of a horizontal straight grate pelletizing machine embodying the invention.

The horizontal straight grate pelletizing machine of FIGURES 1–4, inclusive, comprises an endless traveling grate 1 made up of conventional pallets 2 of conventional design, each having a permeable bottom 3 and confronting sidewalls 4. The pellets are supported and caused to travel by conventional means in an upper material-carrying path 1a and a lower return path 1b. When on the upper path the pallets abut to form a continuous channel-shaped grate 1 that is caused to travel from the feed to the discharge end of the machine, as indicated by the arrows, being driven thus by suitable conventional means, not shown. The grate passes between an upper hood 5 and groups of lower windboxes 6, 7, 8 and 9. The hood is suitably subdivided by conventional partitions 11, 12 and 13. These partitions, groups of windboxes 6, 7, 8 and 9, and their respective cross ducts 15, 16, 17 and 18, as well as associated equipment to be described, provide an updraft drying zone 21, a downdraft high temperature zone 22, a downdraft air recirculation zone 23, and an updraft cooling zone 24 adjacent the discharge end of the apparatus.

As the grate 1 carries green iron ore balls through these zones, the green balls are first subjected to gases at a temperature of about 800° F. to 850° F. in zone 21, to gases at a temperature of about 2350° F. to 2500° F. in zone 22, depending on the composition of the balls, to gases at a temperature of about 800° F. to 850° F. in zone 23, and to air at ambient temperature in zone 24.

The green balls are formed of finely divided ore or ore concentrates, water and other ingredients as indicated above on suitable conventional balling equipment such the balling drum described and claimed in J. F. Baier Patent No. 2,822,076. The green balls thus formed are discharged onto the feed end of the material-carrying upper run of the grate by suitable feeding means 25 which includes as inclined roller feeder 26, side layer forming means 27, and, if desired, hearth layer forming means, not shown for the sake of clearness. These green balls are deposited in a bed 28 (FIGURE 2) that rests on the continuous permeable hearth formed by the abutting bottoms 3, and between the continuous sidewalls defined by the abutting sidewalls 4, of the pallets in the upper run of the grate. After having been carried by the grate through the various zones, the heat hardened pellets are discharged from the discharge end of the grate onto suitable receiving means 29.

The heat for the process carried out by the apparatus is produced by burners 31 that discharge their hot gases of combustion into the heating zone 22. Two burners 31 are shown, but as many burners may be used as are required to supply the desired heating effects. The illustrated system is utilized to recover a high proportion of the sensible heat of the hot pellets. In this system, ambient air is drawn through duct 32 by fan 33 and discharged at above atmospheric pressure into the cross duct 18 communicating with the windboxes. The air passes from these windboxes through the permeable hearth of the grate 1 and the bed of pellets thereon, into the hood portions over the cooling zone 24. A portion of the air, which is now heated to approximately 800° F. to 850° F. by the pellets, is then passed through duct 34 by blower 35 to the burners 31 where it provides secondary combustion and cooling air as is explained below. A branch duct 36 may be provided if desired.

The remaining portion of the air supplied by windboxes 9 to zone 24 travels laterally in the hood 5 under partition 13 into the air recirculation zone 23, from whence it passes downwardly through the bed of hot pellets into windboxes 8, and into cross duct 17. This air is propelled by fan 30 into duct 37 from whence it is passed by fan 38 into cross duct 15 and windboxes 6 through the grate and the bed of green balls on the grate in the drying zone 21 of the grate. This air, which is at a temperature of approximately 800–850° F., removes excess moisture from the balls and raises their temperature sufficiently to prevent cracking of the balls on subsequent high temperature heating. The efficient air, at a temperature of about 250° F., then discharges to atmosphere through duct 39.

In the high temperature heating zone 22 hot gases at about 2350–2500° F., provided by burners 31 as described below, pass downwardly through the bed of balls on the grate, heating them to pelletizing temperatures as they pass through this zone and through the succeeding zones. The hot gases of combustion leaving zone 22 pass into downwdraft windboxes 7, into cross duct 16 and into the fan 38 which discharges the gases as waste to a stack or to heat recovery means.

Figure 4:
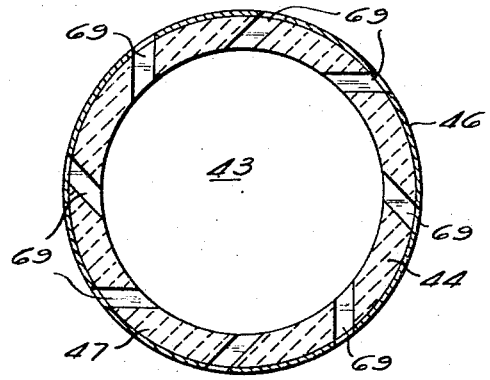
FIGURE 4 is a section along line 4—4 of FIGURE 2.
Figure 3:
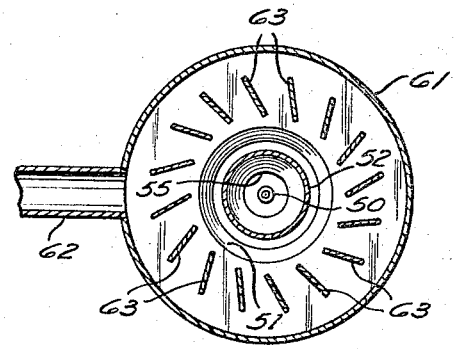
FIGURE 3 is a section through line 3—3 of FIGURE 2.
Figure 2:
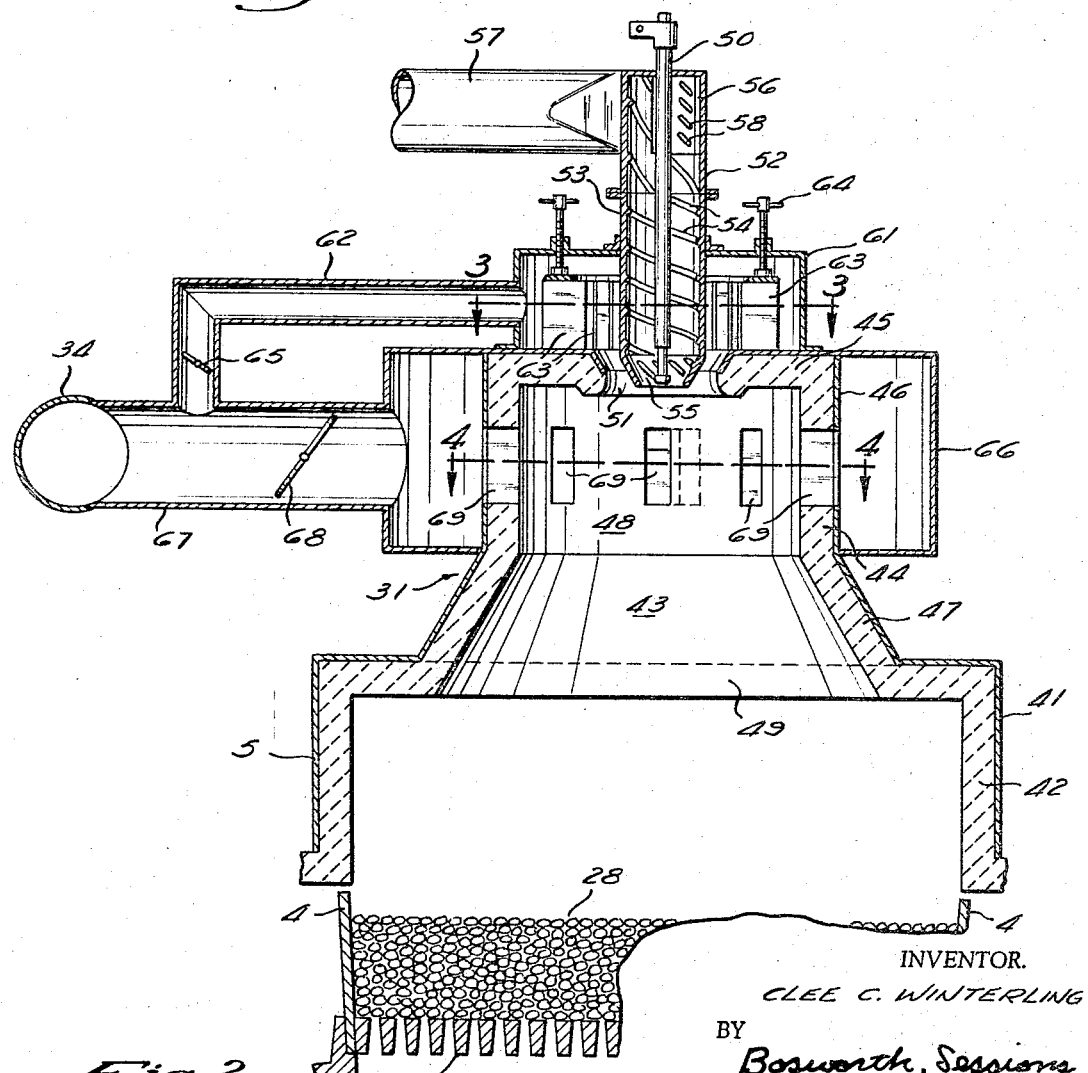
FIGURE 2 is a section through one of the burners along line 2—2 of FIGURE 1 but to a larger scale.

The construction and operation of each of the illustrated burners 31 will be apparent from the following discussion in connection with FIGURES 2 to 4, inclusive. The hood 5 comprises a steel outer casing 41 that is lined with refractory material 42 in conventional manner. Each burner 31 comprises a combustion chamber 43 defined by a sidewall 44 and top wall 45, each made up of a metal shell 46 and lined with refractory material 47. The combusion chamber defines an upper portion 48 having a generally cylindrical interior and a lower portion 49 having diverging walls that define a generally frustoconical interior. This lower portion communicates with the interior of the hood 5.

The top wall 45 of the combustion chamber has a central opening 51 into which projects a vertically disposed fuel burner nozzle 52. This nozzle 52 may be conventional, resembling nozzles employed in conventional horizontal firing of pulverized coal burners for steam generators. The illustrated nozzle comprises a generally cylindrical tubular casing 53 having internal helical ribs 54 and a restricted discharge zone 55. The nozzle also has an inlet opening 56 that substantially tangentially enters the nozzle from a conduit 57. This conduit is connected to conventional means, not shown, supplying a mixture of primary air and pulverized coal to and through the nozzle in a conventional manner. The nozzle includes a central tubular structure 50 for an ignition torch or for introduction of alternate gas or oil fuel. The nozzle has internal deflectors 58 at its inlet to aid in uniformly distributing the coal particles around the periphery of the nozzle interior; the helical ribs 54 aid in maintaining uniform distribution of the mixture of coal and air passing through the nozzle.

Nozzle 52 is surrounded by a metal housing 61 of circular plan cross section connected by duct 62 to duct 34, that carries hot air from the cooling zone 24. Housing 61 has vanes 63, adjustable by handles 64, to provide spiral swirling flow of air from housing 61 into combustion chamber 43, which swirling flow preferably is in the same rotational direction as the swirling flow of the mixture of coal and primary air from nozzle 52. Duct 62 has a valve 65 for adjusting air flow.

Another housing 66, located below housing 61, surrounds the upper portion 48 of the combustion chamber 43 and is connected by duct 67, having an air control valve 68, to duct 34. This housing 66 communicates with the upper interior portion of the combustion chamber by openings 69. These openings are preferably equally spaced and generally tangentially disposed in the upper wall of the combustion chamber to cause swirling flow of air through the openings. Moreover, the openings preferably are at an angle such that radiations from burner flames cannot directly impinge on the metal walls of the housing 66. Preferably, as shown in FIGURE 4, the openings 69 are disposed at angular directions such that the air entering them swirls in the opposite direction from the secondary combustion air entering the opening 51 in the top wall of the combustion chamber.

A suitable mixture of coal and air is therefore discharged from nozzle 52 with a swirling motion that is accentuated by the swirling motion of the secondary combustion air entering through the opening 51 in the top of the combustion chamber 43. The resulting efficient combustion of the coal results in flame and hot gases of combustion having temperatures in the neighborhood of 2800° F. or more, which would be excessive for heating the pellets. However, according to the present invention, this temperature is reduced by the addition of tempering or cooling air through the openings 69 from the housing 66 downstream from the nozzle 52 and from the opening 51 through which secondary combustion air enters. This tempering air is added in a quantity and at a rate, adjusted by valve 68, sufficient to reduce the temperature of the hot gases to the desired lower temperature of about 2350° F. Furthermore, since the air enters substantially tangentially through the openings 69, it is given a swirling flow that causes it to intermix thoroughly with the hot gases of combustion without blowing out the flame. The swirling turbulent motion of the gas and flame in the combustion chamber sweeps ash developed during combustion away from the walls of the combustion chamber, and deposits it on the pellet bed, this deposition of ash being facilitated by the downdraft flow of the gases through the bed. Intimate mixing of the tempering air with the combustion gases and prevention of the deposition of ash are promoted when, as shown, the tempering air is introduced so it swirls in the direction opposite to that from the primary and secondary combustion air.

The green balls in the bed 28 are thus heated to the desired temperature by a gas that has a high degree of uniformity of temperature and composition. Any ash that may pass through the pellet bed may be readily removed by suitable ash-removal means in the duct system through which discharge the hot gases from the high temperature zone.

Instead of several separate combustion burners, as shown in FIGURES 1–4, inclusive, horizontal grate pelletizing apparatus may embody a single burner 70 like that shown in FIGURE 5. This figure shows a portion of a longitudinal cross section of a pelletizing machine similar to that shown in FIGURE 1, but having a single burner 70 made up of a single elongated combustion chamber 71 having a sidewall 72, the upper portion of which is vertical and the lower portion of which is inclined to facilitate proper distribution of the gas. This burner includes several burner nozzles 73, each of which may be identical to that described above in connection with the previous embodiment, comprising a casing 74, helical ribs 75 and a central tubular structure 76 for ignition purposes or supplying gas or oil. The lower end of each of these nozzles projects into an individual opening 77 in the top wall 78 of the combustion chamber.

The lower portions of all nozzles are surrounded by a housing 79 containing vanes 80 around each nozzle that are adjustable by means 81, to impart a swirling spiral motion to air passing from housing 79 through each opening 77 into the common combustion chamber 71. The housing 79 communicates at one end with a branch duct 82 opening into a duct 34 connected to the cooling zone of the pelletizing apparatus, as in the previous embodiment. The other end communicates through branch duct 83 with a housing 84 that defines a plenum chamber surrounding the lower portion of combustion chamber 71. Openings 85 through the upper portion of the sidewall 72 of the combustion chamber provide communication between the interior of the combustion chamber and the interior of housing 84. These openings preferably are disposed at angles to the wall 72 to cause turbulent flow of air entering them and also to prevent direct impingement of radiation from the flames on the inner surfaces of housing 84.

The apparatus of this embodiment operates similarly to that of the previous embodiment. A mixture of coal and air is injected through each of nozzles 73 into the combustion chamber, as through nozzle 52 of the first embodiment, and burned efficiently in secondary combustion air introduced with a swirling motion through each of the top wall openings 77 from housing 79. Tempering air is also introduced downstream of the nozzles 73 and of the openings 77 for secondary combustion air, with a swirling flow through sidewall openings 85 from housing 84, to cool the high temperature combustion gases and provide hot gas having the desired substantially uniform lower temperatures suitable for heating the pellets in the bed 28. Ducts 82, 83 and 34 are provided with adjustable valves 86, 87 and 88 to regulate to the proper proportions the air passing to housings 79 and 84.

Recovery of heat from the heated pellets and the utilization of such heat can be effected in the same ways as in the previous embodiment, and no further discussion is required.

The grate kiln apparatus of FIGURES 6 and 7 comprises a generally horizontal grate 90 that is made up of pallets 91 having permeable hearths 92 and upstanding sidewalls 93 defining a channel-shaped grate. The pallets are driven in an upper path by suitable means not shown in the direction shown by the arrow in FIGURE 6, being returned in a lower path. This grate can be essentially similar to that discussed above in connection with FIGURE 1, except that it is shorter in length. Grate 90 discharges into a rotating kiln 94 that rotates about an axis inclined from the horizontal, its end remote from the grate being the discharge end. The illustrated kiln discharges into suitable cooler 95. The kiln is supported by rollers 96 and driven by motor 97 through gears 98, 99.

Green iron ore balls of the type described above are formed by means, not shown, as indicated above and fed onto the feed end of the grate 90 at 101, as by feed means such as that previously indicated. The green balls travel lengthwise of the grate through hood 102 to the grate discharge end 103, from which they discharge into the entrance end 104 of the kiln. The balls are dried and preheated on the grate by hot gases discharged from the kiln. The preheated balls then enter the kiln and are brought up to final pelletizing temperatures before being discharged into the cooler 95. From the cooler they pass through suitable discharge means 105.

The required hot gases of combustion are produced at the discharge end of the kiln by the burner 106, to be described later, and pass lengthwise of the kiln countercurrent to the direction of travel of the pellets, to the grate. The gases pass downwardly through the grate in the preheating zone 107 in hood 102 of the grate and are withdrawn below the grate by a duct 108 communicating with a fan 109 that discharges the gases, which have lost some of their sensible heat, to the zone 111 above the grate for predrying purposes. The gases then are withdrawn by duct 112 and fan 113 and discharged to waste through duct 114 or utilized for waste or other purposes.

At the discharge end of the grate, cooling air is drawn through conduit 115 into the cooler 95 by fan 116 which also draws the air through the pellets in the cooler. Heated air is then discharged through duct 116.

Burner 106 produces hot gases having desired temperatures between about 2350° F. and about 2500° F. as described later. The gases leaving the kiln average about 1950° F. or more and pass through the bed of pellets in the preheating zone 107 of the grate. The gases leaving this section average about 650° F. in temperature and pass through the drying zone 111 of the grate before being expelled in the atmosphere at a temperature of about 250° F.

All parts so far mentioned, except burner 106, are conventional and require no further description.

The burner 106 of the apparatus of FIGURE 6 is shown in enlarged scale in FIGURE 7. It comprises a burner nozzle 117 like those previously described, comprising a casing 118 having internal spiral ribs 119 and a central tubular structure 121 for introduction of gas or oil fuel or ignition means. Casing 118 communicates through conduit 122 with conventional means supplying a suitable mixture of pulverized coal and primary combustion air. The lower portion of nozzle 117 is surrounded by housing 123 connected to duct 116 supplying heated air from the cooler 95. Housing 123 contains vanes 124, adjustable by handles 125, to impart spiral flow to the air discharged from the central portion of the housing.

A refractory-lined sleeve member 126, generally bell-shaped, is located to receive the mixture of pulverized coal and air discharged from nozzle 117. A portion of the air discharged from housing 123 passes into member 126 through openings 127. The remainder of the air discharged from the housing passes outside member 126 through passage 128 into the main housing 129 of the burner unit, which housing is fixed to the discharge end of the kiln 94 so hot gases can discharge from the burner into the kiln.

A sleeve member 130, which may be generally cylindrical, is mounted outside the bell-shaped member 126 so it overlaps beyond the discharge end of member 126 with a space 131 between the interior of member 130 and the outside of member 126. A second sleeve member 132, which may be generally cylindrical, surrounds member 130 with its discharge end overlapping beyond the discharge end of member 130 and with a space 133 between the members 130 and 132. These sleeve members are supported from the housing by vane-type supporting members 134 and 135. The interior of bell-shaped member 126, the portion of the interior of member 130 that extends beyond the end of member 126, and the portion of the interior of member 132 that extends beyond the end of member 130 define a combustion chamber 136 that is coaxial with the common axis about which air openings 127 and 128 are located and that constitutes the axis of the circular interior of the kiln 94. A fixed ignition torch 137 may be provided if desired.

The air passing from housing 123 through openings 127 into the interior of the member 126 is secondary combustion air, while the air passing through the opening 131 between members 126 and 130 and the air passing between members 130 and 132 constitutes tempering air to reduce to desired pelletizing temperature the excessively hot gases of combustion produced by efficient combustion of pulverized coal in the primary and secondary combustion air.

All of the air emanating from housing 123 has a swirling flow pattern imparted to it by vanes 124 to promote turbulence and thorough intermixing of the secondary combustion air with the primary combustion air and pulverized coal, and thorough mixing of the tempering air with the hot gaseous products of combustion resulting from combustion of the coal. Vane-type supports 134 and 135 can also be angularly disposed to cause swirling of the air passing them.

Swirling action and turbulence of the air causes the air to sweep the surfaces of members 126, 130 and 132, as well as the inner surface of the housing 129, to prevent accumulation of ash, and to cause the ash to be carried into the kiln, from which it can be discharged into the cooler and into the pellets or otherwise removed therefrom. The overlapping arrangement of members 126, 130 and 132 prevents radiations from impinging on the walls of housing 129, while passing air also aids in protecting it from damaging heat.

Thus, in each of the illustrated embodiments the burner achieves the desired complete, efficient combustion of particulate solid fuel, reduces the gas temperature to the desired lower temperature for agglomeration, and prevents harmful accumulation of ashes. These factors make possible the desired agglomeration at a lower fuel cost than heretofore possible.

While the invention has been described in connection with the pelltizing of iron oxides, it is apparent that it can be used in connection with the pelletizing of other pelletizable material. Furthermore, it can be used in connection with other types of agglomeration of ores or other materials, as by sintering.

These and other modifications of the invention will be apparent to those skilled in the art. It is, therefore, to be understood that this patent is not to be limited to the forms of the invention disclosed herein or in any other manner than by the scope of the appended claims.

I claim:
1. Apparatus for heating finely divided material comprising a chamber having an opening adapted to have heating gas discharged therefrom; means for causing said finely divided material to travel past said chamber in proximity to said discharge opening where it is exposed to heating gas discharged from said chamber; a nozzle having a discharge opening for introducing into said chamber a mixture of primary combustion air and particulate solid fuel that produces ash upon combustion; means for supplying secondary combustion air to said chamber in proximity to the discharge opening of said nozzle and intermixing said secondary combustion air with said fuel and primary combustion air to cause efficient combustion of said fuel to produce hot gaseous combustion products after ignition of said fuel; means for supplying tempering air, at a lower temperature than said hot gaseous combustion products, to said hot gaseous combustion products at a location in said chamber spaced from the discharge opening of said nozzle; and means for mixing said tempering air with said hot gaseous combustion products to produce hot heating gas of desired substantially uniform lowered temperature and to cause said heating gas to sweep interior portions of said chamber to prevent accumulation of ash thereon.

2. The apparatus of claim 1 comprising means for adjustably controlling flow of supplied air.

3. Apparatus of claim 2 in which said means for supplying secondary combustion air supplies heated secondary combustion air to the interior of said chamber.

4. The apparatus of claim 1 in which said means for supplying tempering air supplies said air at a location in said chamber spaced downstream from the discharge opening of said nozzle.

5. The apparatus of claim 1 in which said means for supplying tempering air supplies said air at a location in said chamber spaced downstream from the location in which the secondary combustion air is supplied.

6. The apparatus of claim 1 in which said means for supplying secondary combustion air introduces it substantially uniformly around said nozzle in close proximity to the discharge opening of said nozzle.

7. Apparatus for heating finely divided material comprising a chamber having an opening adapted to have heating gas discharged therefrom; means for causing said finely divided material to travel past said chamber in proximity to said discharge opening where it is exposed to heating gas discharged from said chamber; a nozzle having a discharge opening for introducing into said chamber a mixture of primary combustion air and particulate solid fuel that produces ash upon combustion; means for supplying secondary combustion air to said chamber in proximity to the discharge opening of said nozzle and intermixing said secondary combustion air with said fuel and primary combustion air to cause efficient combustion of said fuel to produce hot gaseous combustion products after ignition of said fuel; and means for introducing tempering air, at a lower temperature than said hot gaseous combustion products, into said chamber with swirling flow in a location spaced from the discharge opening of said nozzle where said tempering air can intimately mix with said hot gaseous combustion products to produce hot heating gas of desired substantially uniform lowered temperature and to cause said heating gas to sweep interior portions of said chamber to prevent accumulation of ash thereon.

8. The apparatus of claim 7 in which said means for introducing secondary combustion air introduces said air with swirling flow.

9. The apparatus of claim 8 in which said means for supplying tempering air with swirling flow supplies it at a location in said chamber downstream from the discharge opening of said nozzle.

10. The apparatus of claim 7 in which said means for introducing tempering air introduces it around said discharge opening in said nozzle in a zone in said chamber spaced from the discharge opening in said nozzle.

11. The apparatus of claim 7 in which said means for supplying secondary combustion air introduces it substantially uniformly around said nozzle in close proximity to the discharge opening of said nozzle.

12. The apparatus of claim 1 in which said means for introducing tempering air into said chamber and mixing it with said hot gaseous combustion products comprises overlapping sleeve members in said chamber extending axially downstream away from said nozzle member.

13. The apparatus of claim 12 in which tempering air is introduced into the space between at least two overlapping sleeve members.

14. Agglomeration apparatus comprising means for moving finely divided material to be agglomerated in the form of a layer that travels in a generally horizontal path; enclosure means through which said material travels while said material is heated by heating gas to agglomerate it and through which said hot agglomerated material passes; burner means for burning particulate solid fuel to produce said heating gas comprising a chamber communicating with said enclosure means to discharge heating gas into said enclosure means while said finely divided material travels past said chamber in proximity to said discharge opening; a nozzle having a discharge opening for introducing into said chamber a mixture of primary combustion air and particulate solid fuel that produces ash upon combustion; means for supplying heated secondary combustion air to said chamber in proximity to the discharge opening of said nozzle and intermixing it with said fuel and primary combustion air to cause efficient combustion of said fuel to produce hot gaseous combustion products after ignition of said fuel; means for supplying tempering air, at a lower temperature than said hot gaseous combustion products, to said hot gaseous combustion products at a location in said chamber spaced from the discharge opening of said nozzle; means for mixing said tempering air with said hot gaseous combustion products to produce hot heating gas of desired substantially uniform lowered temperature and to cause said heating as to sweep interior portions of said chamber to prevent accumulation of ash thereon; and means for transferring heat from said hot agglomerated material to at least a portion of said air supplied to said chamber.

15. Apparatus for treating finely divided material with heat comprising a rotatable kiln through which said finely divided material travels to the discharge end of the kiln; cooling means into which said hot material discharges from said kiln; burner means for burning particulate solid fuel to produce heating gases for heating said material in said kiln comprising a chamber having a discharge opening communicating with the interior of said kiln at one end thereof, a nozzle having a discharge opening for introducing into said chamber a mixture of primary combustion air and particulate solid fuel that produces ash upon combustion; means for supplying secondary combustion air to said chamber in proximity to the discharge opening of said nozzle and intermixing said secondary air with said fuel and primary combustion air to cause efficient combustion of said fuel to produce hot gaseous combustion products after ignition of said fuel; means for supplying tempering air, at a lower temperature than said hot gaseous combustion products, to said hot gaseous combustion products at a location in said chamber spaced from the discharge opening of said nozzle; and means for mixing said tempering air with said hot gaseous combustion products to produce heating gas of desired substantially uniform lowered temperature and to cause said heating gas to sweep interior portions of said chamber to prevent accumulation of ash thereon.

16. The apparatus of claim 15 in which said means for introducing tempering air to said burner chamber comprises overlapping sleeve members in said chamber extending axially downstream away from said nozzle member.

17. The apparatus of claim 15 comprising means for cooling hot material discharged from said kiln; and means for transferring heat from said hot material to at least a portion of said air supplied to said chamber.

References Cited by the Examiner
UNITED STATES PATENTS

| | | | |
|---|---|---|---|
| 1,073,463 | 9/1913 | Banes | 110—28 |
| 1,777,411 | 10/1930 | Mayr | 110—28 |
| 2,031,048 | 2/1936 | Lee | 110—104 |
| 2,512,196 | 6/1950 | Caracristi | 110—28 |
| 2,615,407 | 10/1952 | Ragusan | 110—104 |
| 2,925,336 | 2/1960 | Stowasser | 75—3 |
| 3,172,754 | 3/1963 | Anthes et al. | 266—21 X |
| 3,203,782 | 8/1965 | Meyer et al. | 226—21 X |
| 3,235,372 | 2/1966 | Sanden | 75—5 |
| 3,244,507 | 4/1966 | Linney | 75—3 |

FREDERICK L. MATTESON, JR., *Primary Examiner.*

JOHN J. CAMBY, *Examiner.*